United States Patent [19]

Brückner

[11] Patent Number: 4,948,943
[45] Date of Patent: Aug. 14, 1990

[54] FLAT CONSTRUCTION SELF-SUPPORTING FLOOR PLATE FOR HEATABLE RAISED FLOORS

[75] Inventor: Günther Brückner, Abtswind, Fed. Rep. of Germany

[73] Assignee: MERO-Werke Dr. Ing. Max Mengeringhausen GmbH & Co., Fed. Rep. of Germany

[21] Appl. No.: 281,227

[22] Filed: Dec. 8, 1988

[30] Foreign Application Priority Data

Dec. 16, 1987 [DE] Fed. Rep. of Germany ....... 3742559

[51] Int. Cl.$^5$ ................................ H05B 3/36
[52] U.S. Cl. ..................... 219/213; 52/680; 165/49
[58] Field of Search ............. 219/213; 165/65, 69, 165/49; 237/69; 52/681, 680, 689, 173

[56] References Cited

U.S. PATENT DOCUMENTS

| 3,290,842 | 12/1966 | Aberg | 52/689 |
| 4,338,994 | 7/1982 | Hewing | 165/53 |
| 4,508,162 | 4/1985 | Radtke | 165/49 |

FOREIGN PATENT DOCUMENTS

| 1609738 | 3/1966 | Fed. Rep. of Germany. | |
| 1250573 | 9/1967 | Fed. Rep. of Germany | 219/213 |
| 2004101 | 1/1970 | Fed. Rep. of Germany. | |
| 2319889 | 10/1974 | Fed. Rep. of Germany | 219/213 |
| 8500770 | 1/1984 | Fed. Rep. of Germany. | |
| 3330778 | 3/1985 | Fed. Rep. of Germany. | |
| 419843 | 11/1934 | United Kingdom | 219/213 |

Primary Examiner—John E. Murtagh
Attorney, Agent, or Firm—Frank P. Presta

[57] ABSTRACT

Self-supporting raised floor plates of flat construction, with an outside wrapper consisting of a flat metal shell which is open at the top for a mineral, age-hardenable filler material, for instance anhydrite, are known. However, with such raised floor plates of flat construction, the embedding of an electric heating line in the layer of mineral material so that the heating line is found without interference in the statically neutral zone of the raised floor plate is problematic. The invention overcomes this problem in that the heating line is fastened to holders arranged over the bottom of the shell. These holders are fastened by clamping by means of a plug-like member in selected anchoring openings in the bottom of the shell. The heating line is clipped or respectively snapped into slots in the head segments of the holders.

3 Claims, 1 Drawing Sheet

FLAT CONSTRUCTION SELF-SUPPORTING FLOOR PLATE FOR HEATABLE RAISED FLOORS

BACKGROUND OF THE INVENTION

The present invention relates to a self-supporting floor plate of flat construction for heatable raised floors made up of a layer of an aged, mineral material, for instance anhydrite, concrete or the like, with a metal wrapper, wherein an electric heating line is embedded in this layer of mineral material, and the heating line engages with the wrapper.

In the case of raised floor plates of the above type, of those which have a relatively low structural height of for instance only about 3 cm, embedding the electric heating line in a uniform plane in the mineral material before the mineral material ages and hardens is generally problematic, especially when this plane is to lie in the statically neutral zone of the raised floor plate.

In the case of a known raised floor plate of the aforementioned structural type (German Offenlegungschrift No. 33 30 778), the wrapper consists of a metal frame which is approximately the height of the plate, in which a metal grating is affixed in the inside. With this construction, the electric heating line can be fastened to the metal grating before the age-hardenable mineral material is filled into the metal frame and is compressed therein. Therefore, in this case, the wrapper in the form of a grating can be constructed at the same time as the holder for the heating line. However, if the raised floor plate has only one wrapper on the outside in the form of a flat, metal shell which is open at the top, such as for instance is known from German Patent No. 20 04 101, the problem which has already been mentioned, of embedding the heating line securely in a preferred plane in the cross section of the flat layer of mineral material in the shell-shaped wrapper, still occurs.

SUMMARY OF THE INVENTION

Therefore, the object of the present invention is to provide a solution for this problem.

According to this invention, the solution to the aforementioned problem is disclosed in that with a floor plate having an outside wrapper, known in and of itself, made up of a flat shell which is open at the top, which has numerous anchoring openings with neck-like inwardly trained edges at least in the floor of the shell for the layer of mineral material, the heating line is fastened to holders in an arrangement distributed across the floor of the shell, and the holders are fastened each by means of a plug-like member or the like in selected anchoring openings in the floor of the shell. The electric heating line can, for instance, be held securely by these holders in numerous loop catches in a plane over the floor of the shell or, respectively, at some distance from the floor, so that their position is unchanged even with subsequent filing of the flowable or feedable and age-hardenable filler material into the shell, and especially even during its compression which may be by shaking.

Therefore, a reliable embedding of the electric heating line in the mineral filler material is guaranteed in a simple manner by the invention, and its spacing from the floor of the shell can be controlled without further difficulty by suitable construction or respectively suitable dimensioning of the holders, so that the electric heating line lies in the statically neutral zone of the raised floor plate, which is what is preferred. The holders can be pressed down for instance from above by means of the plug-like members into certain selected anchoring openings in the bottom of the shell, which are present whether used in such a manner or not. The plug-like members of the heating line holders are to be understood to be also elements which, for instance, may consist of a plurality of radially flexing clamping arms. Instead of the clamping method of fastening, the holders can also be glued in, welded in, fitted in, screwed in or riveted in.

When a head segment at the plug-like member of the heating line-holder device is provided with a support edge which rests on the inwardly trained edge of the anchoring openings and the head segment includes a horizontal slot at its top for the fitted reception of the electric heating line, than both the assembly of the holder on the bottom of the shell and also the insertion of the electric heating line are further facilitated.

When, according to another configuration of the invention, the plug-like member is configured as a clamping fixture of the heating line-holder device which is slightly conical in structure, the pressing down and with that the clamping fastening of the holders in the anchoring openings in the floor of the shell becomes still simpler. The heating line-holders advantageously are of a tough elastic plastic material. Thus they can be manufactured at low cost and in great numbers, for instance, by injection molding.

When the heating line-holder devices are manufactured of an elastic material, then, according to still another configuration of the invention, it is advantageous to provide that the horizontal slot in the head segment of the heating line-holder be arranged with an approximately circular cross section at such a depth that the distance separating the two facing edges of the slot is smaller than the diameter of the heating line, so that the heating line can be snapped into the slot of the holder.

Also, flexible arms or the like can be provided on the head segment of the heating line-holder for fixing of the electric heating line according to the invention,, and they can be molded to the head segment for a click-catch fitting, or also pushbutton-like fastening means can be provided.

BRIEF DESCRIPTION OF THE DRAWINGS

The invention is to be described hereinafter relative to the drawing of one exemplary embodiment. In the drawing.

DESCRIPTION OF THE PREFERRED EMBODIMENT

Figure 2:
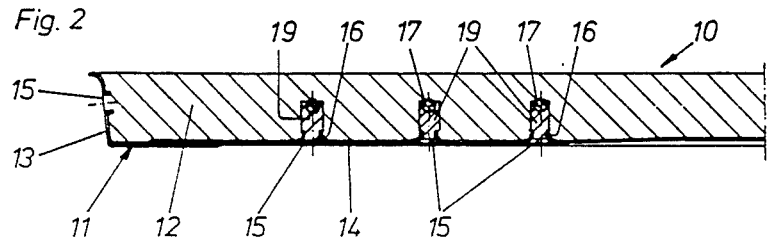
FIG. 2 is a partial sectional view along line II—II of FIG. 1 in larger scale with a filler material already in the shell-shaped wrapper.
Figure 3:
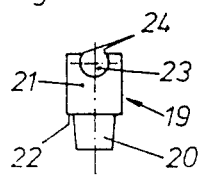
FIG. 3 is a separate elevational view of a heating line-holder.

The raised floor plate (10) which is shown only partially in cross section in FIG. 2 is constructed to be self-supporting only at its four corners on posts (not shown) which are fastened to the foundation of the relevant building structure. Raised floor plate (10) includes a flat, metal shell (11) which is open at the top serving as outside wrapper for a layer (12) of a mineral material, for instance anhydrite, which in flowable state is filled into shell-shaped wrapper (11) and is compressed therein, for instance by shaking (rocking). Following the subsequent age hardening of layer (12) and also the grinding down and finishing of the top of this layer the cover layer (not shown) for instance consisting of carpeting is glued on.

Metal shell (11) incorporates numerous circular anchoring openings (15) both in the side walls (13) and in the floor or bottom (14) for layer (12) of mineral material. These anchoring openings (15) each have neck-like inwardly directed edges (16) which are generally somewhat frayed at the top. Anchoring openings (15) are indicated simply diagrammatically in FIG. 1 by crosses in the bottom (14) of the shell and by broken lines in the side walls (13). The structural height of raised floor plate (10) is very low and, for instance, in a generally preferred embodiment is only about 3 cm high. Raised floor plate (10) can be heated by means of an electric heating line (17) embedded in mineral material layer (12). The ends (18) of electric heating line (17) are guided outwardly or respectively downwardly by the bottom (14) of the shell and are provided with electric installation and connection means (not shown) in order to produce the electric connection to the power supply or respectively to an adjacent raised floor plate. This technology is known and therefore need not be discussed further at this point.

Figure 1:
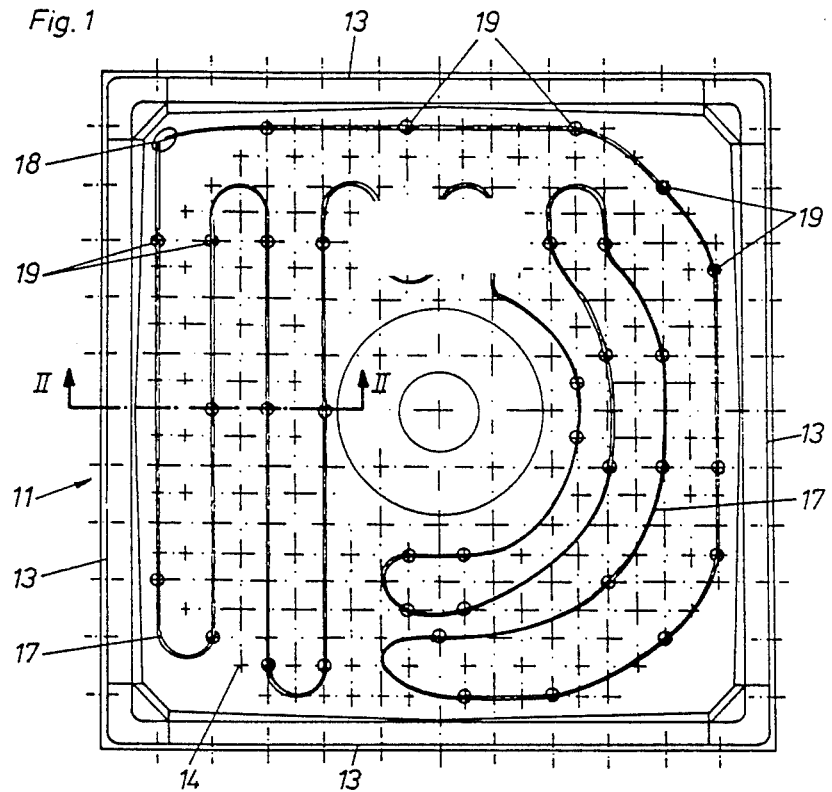
FIG. 1 is a plan view of a shell-shaped wrapper for a raised floor plate with an electric heating line built in according to the invention before the filling of the shell with a flowable or feedable, age-hardenable mineral material, for instance, anhydrite.

In order to position heating line (17) in a numerous loop catches securely in one plane in metal shell (11), preferably lying in the statically neutral zone of the completed raised floor plate (10), heating line (17) is supported by numerous holders (19), as is shown in FIG. 1 diagrammatically.

Heating line-holder devices (19) are preferably produced from a tough-elastic plastic material and have in turn a plug-like, slightly conically configured member (20) and a head segment (21) as the top part of this member, which has a somewhat larger diameter than member (20), whereupon an annular mounting edge (22) is obtained. Holders (19) are distributed over the bottom (14) of the shell, with their plug-like members (20) pressed into a selected number of anchoring openings (15) and thus in the exemplary embodiment anchored to the bottom (14) of the shell. Thus the mounting edge (22) rests on the neck-like inwardly turned edge (16) of anchoring openings (15).

Figure 4:
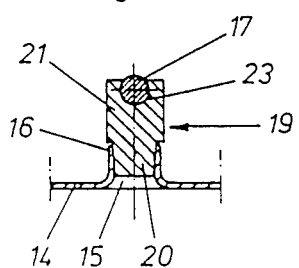
FIG. 4 is a sectional view of a heating line-holder pressed into an anchoring opening in the floor of the shell-like wrapper with an electric heating line snapped therein.

Head segments (21) of heating line-holders (19) have a horizontal slot (23) on the top, which is configured to be open at the top and is of sufficient depth that the distance separating the two edges (24) of slot (23) is somewhat smaller than the diameter of heating line (17). The fixing of electric heating line (17) in holders (19) mounted on the bottom (14) of the shell occurs simply by snapping or clipping heating line (17) into slots (23). Thus the parts which are pressed outward spring back with edges (24) of head segments (21) into their holding position shown in FIG. 4. In this manner, electric heating line (17) is connected securely with holders (19), which in turn are fastened by the plug-like members (20) to the bottom (14) of the shell. For the complete picture it is to be noted that each metal shell (11) of floor plate (10) is grounded when the raised floor is completed.

In the production of a heatable raised floor, all of the floor plates (10) or else only certain selected floor plates (10) at certain selected points of the raised floor, where a certain heating requirement is present, can be provided with an electric heating line (17).

Holders (19) can also be of other types of materials than plastic. If holders (19) are metal, for example, the heat conduction to metal shell (11) is advantageously improved.

What is claimed is:

1. Flat construction self-supporting floor plate for heatable raised floors, comprising a layer of a mineral, age-hardened material, for instance anhydrite, concrete or the like, with a metal wrapper, wherein an electric heating line is embedded in this layer of mineral material, which is connected with the wrapper, characterized in that the heating line (17) is fastened to holders (19) distributed over the bottom (14) of the shell making up a floor plate (10) with an outside wrapper comprised of a flat shell (11) which is open at the top which has a plurality of anchoring openings (15) distributed at least in the bottom (14) of the shell for the layer (12) of mineral material with neck-like inwardly turned edges (16), and the holders (19) comprise plug-like members (20) for fastening them in selected anchoring openings (15) in the floor (14) of the shell; each plug-like member (20) of the heating line-holder (19) having a head segment (21) with a contact edge (22), which rests on the inwardly turned edge (16) of the anchoring opening (15), the head segment (21) having a slot (23) at its top portion for the fitted reception of the electric heating line (17), each plug-like member (20) being configured to be slightly conical and to taper inwardly away from the head segment to engage the edge (16) of the adjacent anchoring opening (15) to retain the heating line-holder (19) therein.

2. Floor plate as in claim 1, characterized in that the heating line-holders (19) are manufactured of a tough elastic plastic material.

3. Floor plate as in claim 1, characterized in that slot (23) in the head segment (21) of the heating line-holder (19) is arranged with somewhat circular cross section at sufficient depth that the distance separating the two edges (24) of the slot (23) is smaller than the diameter of the heating line (17), so that the heating line (17) can be snapped into the slot (23) of the holder (19).

* * * * *